US007684755B2

(12) United States Patent
Pierce et al.

(10) Patent No.: US 7,684,755 B2
(45) Date of Patent: Mar. 23, 2010

(54) GARMENT FOR CONTROLLING AN ELECTRONIC DEVICE

(75) Inventors: William S Pierce, Algonquin, IL (US); Gary J Oswald, Elk Grove Village, IL (US)

(73) Assignee: Motorola, Inc., Schaumburg, IL (US)

( * ) Notice: Subject to any disclaimer, the term of this patent is extended or adjusted under 35 U.S.C. 154(b) by 876 days.

(21) Appl. No.: 11/467,987

(22) Filed: Aug. 29, 2006

(65) Prior Publication Data

US 2008/0056508 A1 Mar. 6, 2008

(51) Int. Cl.
*H04B 7/00* (2006.01)
*H04R 1/02* (2006.01)

(52) U.S. Cl. ................................ 455/41.2; 2/905; 2/96; 381/301; 381/333; 381/338

(58) Field of Classification Search ................ 455/41.2; 2/905, 96; 381/301, 333, 388
See application file for complete search history.

(56) References Cited

U.S. PATENT DOCUMENTS 5,148,002 A * 9/1992 Kuo et al. .................... 219/211
5,416,310 A * 5/1995 Little .................... 235/462.44
5,563,951 A * 10/1996 Wang et al. ................. 381/301
6,243,870 B1 * 6/2001 Graber ............................ 2/69
6,388,422 B1 * 5/2002 Lew ........................... 320/107
6,507,486 B2 * 1/2003 Peterson, III .......... 361/679.03
6,792,124 B2 * 9/2004 Tilbury et al. ............... 381/333
6,834,797 B2 * 12/2004 Gough et al. ............... 235/382
6,895,261 B1 * 5/2005 Palamides ................ 455/575.6
2001/0024949 A1 * 9/2001 Yanagida et al. ............ 455/404
2003/0214408 A1 * 11/2003 Grajales et al. .......... 340/573.1
2004/0114777 A1 * 6/2004 Aubauer et al. ............. 381/333
2005/0054941 A1 * 3/2005 Ting et al. ................... 600/529
2006/0248478 A1 * 11/2006 Liau ........................... 715/863
2007/0250981 A1 * 11/2007 Seibert ............................ 2/69
2008/0024438 A1 * 1/2008 Collins et al. ............... 345/156
2008/0056508 A1 * 3/2008 Pierce et al. .................. 381/87
2009/0048070 A1 * 2/2009 Vincent et al. ................. 482/8

* cited by examiner

*Primary Examiner*—Yuwen Pan
(74) *Attorney, Agent, or Firm*—Gary J. Cunningham

(57) ABSTRACT

Disclosed is a garment (102) made of a particular type of material, the garment can include a garment appendage (104, 108, 110, 112) and a sensor (114, 116) coupled to the garment appendage with the sensor configured to detect activation of the garment appendage. The garment can further include a controller (126) coupled to the sensor, with the controller configured to control a function of an electronic device based on activation of the garment appendage when sensed by the sensor. Also disclosed is a method of a garment as described above, the method including activating the garment appendage so that the sensor detects the activation, and processing a signal from the sensor by the controller to that the controller controls a function of the electronic device.

18 Claims, 3 Drawing Sheets

GARMENT FOR CONTROLLING AN ELECTRONIC DEVICE

FIELD

Disclosed is an electronic device combined with a garment, and more particularly, disclosed is a garment including a garment appendage having a sensor and configured to control a function of the electronic device based on activation of the garment appendage when sensed by the sensor.

BACKGROUND

Presently, electronic devices combined with clothing and apparel accessories are used for military, sports including football gear and scuba gear, astronautic apparel, and health care applications. For example, in a military application, glasses or goggles combined with a wireless communication device may utilize positioning the mouth piece of the communication device to actuate the wireless communication device for use.

In the health care application, the purpose for the combination of apparel with an electronic device may be for the benefit of certain patients who, for example, may be paralyzed and unable to make motions. A combined garment and electronic device may be actuated by voice command, or by a motion as simple as an eye movement. Also, sensors can be used in clothing to monitor limb and organ status.

Wearable electronic devices are becoming less specialized and more available for the consumer market. Recently, apparel such as a ski jacket may be combined with entertainment electronics such as an audio player and/or a communication device such as a cellular telephone. Speakers and/or a microphone may be positioned in a hood or a tall collar. The control panel for the electronic devices that are incorporated into the clothes may be consolidated onto the exterior of a sleeve. The control panel consolidates all input for function controls into a single apparatus. A user can access the control panel by raising one arm and using the other hand to use the controls. Such actuation requires hand and eye coordination.

The controls consolidated onto a sleeve exterior may be difficult to access in certain situations. Moreover, were the clothing to include, for example, several electronic devices such as an audio player device and a communication device, the control panel may be complicated. Accordingly, it may be difficult to manipulate a complicated control panel when a user is in motion or when a user wears gloves as would be the case when wearing a ski jacket/electronic device combination. It would be beneficial if at least some of the controls for the electronic devices combined in apparel could be actuated by simple motions of the user that would avoid the use of a control panel.

SUMMARY

Disclosed is a garment made of a particular type of material, the garment can include a garment appendage and a sensor coupled to the garment appendage with the sensor configured to detect activation of the garment appendage. The garment can further include a controller coupled to the sensor. The controller is configured to control a function of an electronic device based on activation of the garment appendage sensed by the sensor. Also disclosed is a method of a garment as described above, the method including activating the garment appendage so that the sensor detects the activation, and processing a signal from the sensor by the controller to that the controller controls a function of the electronic device.

DETAILED DESCRIPTION

Figure 1:
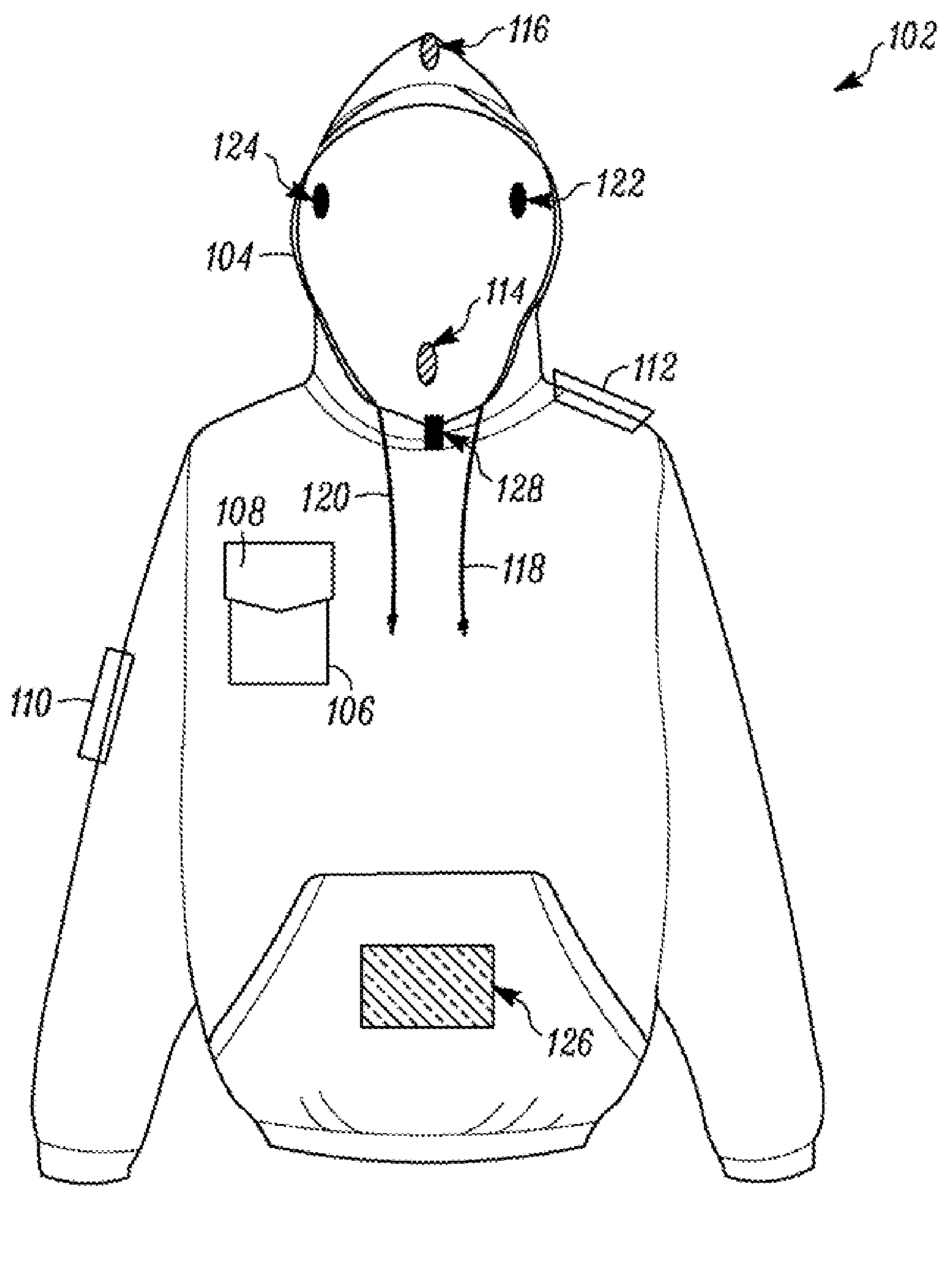
FIG. 1 depicts an example of a garment including an appendage.

A garment may be mostly made of a fabric or a combination of fabrics and other materials. The garment can include an appendage, for example, a hood, drawstring, belt, pocket, pocket flap, tab, zipper gripper, a collar, and the like. The garment can include a sensor for determining actuation of the appendage. For example, if a hood or flap is lifted, a sensor can sense the motion. A controller can be coupled to the sensor of the appendage and to an electronic device. By activating the garment appendage so that the sensor detects the activation, and then processing a signal from the sensor by the controller, the controller can control a function of the electronic device. The motion of an appendage can act as input for controlling one or more functions of electronic devices of the garment. Accordingly, one or more simple motions of the user may avoid the use of a control panel.

A garment, apparel, attire, dress or clothing as described herein can cover portions or all of a user's body. Different garments can cover different portions of a user's body and can leave other portions exposed. For example, a jacket may cover the upper portion of a user's body, including the arms.

As will be described in more detail, a garment appendage can be substantially the same type of material as the garment as a whole. The appendage may be made from a fiber similar to that of the rest of the garment. A sensor may be coupled to the garment appendage, the sensor being configured to detect activation of the garment appendage.

In particular, a sweatshirt is disclosed. The sweatshirt can include a sweatshirt body and sweatshirt hood coupled to the sweatshirt body. At least one sensor can be coupled to the hood. The sensor can be configured to detect an activation of the hood while it is being raised over the user's head. A controller can be coupled to the sensor, the controller, for example, being configured to control an audio function based on input received by the activation of the hood.

Also disclosed is a method of a garment including a garment appendage that may include a sensor. The garment may also include a controller coupled to the sensor and an electronic device. The method may include activating the garment appendage so that the sensor detects the activation and then processing a signal from the sensor by the controller to that the controller controls a function of the electronic device.

Before describing in detail embodiments that are in accordance with the present disclosure, it should be observed that the embodiments reside primarily in combinations of method steps and components related to a garment having an appendage with a sensor and including a controller coupled to the sensor to control an electronic device. Accordingly, the components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of a garment having an appendage with a sensor and including a controller coupled to the sensor to control an electronic device, as described herein.

FIG. 1 depicts an example of a garment, and in particular, a sweatshirt. A garment may be any type of garment, including a jacket, a vest, pants and a hat. The garment can include at least one appendage, such as a hood, a drawstring, a flap, a zipper gripper or a tab. The appendage can be moveable and may include a function of the garment. For example, a hood may be pulled over a user's head to shield the head from wind or sun. A list of appendages may include others such as those that are for decorative purposes as well.

Appendages of a garment may be of substantially the same type of material as the garment. It is understood that a material such as fabric may be made of any composition, such as cotton, wool, polyester, acrylic or any combination of any material. It is understood that the previously mentioned materials are the same type of material since they can be used in apparel construction. Rope as a drawstring may be made of cotton or a cotton/polyester blend in the same way a sweatshirt may be made of acrylic. While the weave of a rope for a drawstring can be different from a weave of the fabric of the body of a sweatshirt, both are fabric and therefore are substantially the same type of material. While elastic may include rubber or a synthetic elastic material, it is understood that elastic is fabric. Generally speaking, any material used to construct clothing or apparel is understood to be of the same type of material.

Returning to FIG. 1, a garment 102 is shown having appendages including a hood 104, a pocket 106 with a flap 108 and two tabs, 110 and 112. The appendages shown on the sweatshirt of FIG. 1 can be coupled to one or more sensors. For example, FIG. 1 shows the hood 104 having two sensors 114 and 116.

A sensor may be coupled to at least one drawstring 118, for example, so the drawstring can provide volume control. Alternatively, two drawstrings or both ends of a single drawstring may provide volume control. For example the first drawstring 118 can provide a louder function and the second drawstring 120 a softer function. The volume control may be for an electronic device that may include at least one speaker in the hood 122 and possibly a second speaker 124.

Any appendage can include a sensor or set of sensors that can provide an activation signal to one or more controllers 126 of one or more electronic devices that can be fixably or removably incorporated into the garment. Also, one or more controllers 126 can be fixably or removably incorporated into the garment as may be any speakers, wiring or other components. Removability of components can be effected by hook and loop fasteners, buttons, snaps, or any other suitable attachment configuration.

To activate a sensor that is coupled to a garment appendage, the appendage may be moved. For example, the act of lifting the hood 104 from one position to another position may cause a sensor to detect the activation of the hood. Lifting the flap 108 of the pocket may similarly cause a sensor to detect the activation of the flap. Also, lifting or moving a tab 110 and/or 112 may cause a sensor to detect activation of those garment appendages. As mentioned above, pulling on a drawstring may cause a sensor to detect activation as well.

The sensor can be of any type. A motion sensor may be placed in the flap 108, or the tabs 110 and 112. An elastic motion sensor may be used in conjunction with the drawstrings 118 and 120. A set of distance sensors 114 and 116 may detect distance or the proximity between each other to determine if the hood 104 has been lifted. It is understood, any type of sensor, including light sensors, motion sensors and accelerometers are within the scope of this discussion.

As mentioned, a control unit 126 may be coupled to one or more electronic devices such as a cellular telephone and an audio player. In one embodiment, a control unit 126 may be a Bluetooth accessory coupled to any type of electronic device such as a remote cellular telephone or audio playback device. For a cellular telephone function, a microphone 128 may be included. Microphone 128 may be fixably or removably attached to an appendage such as a flap that may be moved to a position over the user's mouth. In so doing, the user may provide input to the controller 126 to activate a wireless communication device of the garment.

As mentioned, one or more speakers 122 and 124 may be used for electronic devices such as a cellular telephone and/or an audio playback unit. A stereo speaker set 122 and 124 that may be embedded into the hood 104 may provide an acoustic environment for music and telephone communication when the hood 104 is elevated over a user's head. Positions of the speakers of the stereo speaker set 122 and 124 may be variable so that a user may find customized positions within the hood to position the speakers for the better sound quality.

While described above are a cellular telephone and an audio player, the functions of other electronic devices may be controlled by one or more control units 126 as well. For example, the Bluetooth accessory, the audio module, and the controls on the garment 102 can also be used to transfer audio files from an external device, such as a personal computer. For example, when a user is ready to take a jog and the user wants to load up my audio device with music, the user can tug on both drawstrings to download songs into the memory of the audio device coupled with the garment 102. Additionally, certain electronic functions such as illumination of lights that may be incorporated into the garment and may be activated by the activation of a garment appendage. It is understood, that any number of devices may be controlled by at least one control unit 126 and are within the scope of this discussion.

Were a condition to exist that may require a prompt to the user of the garment, a prompt response may be made by activation of the garment appendage. For example, a prompt may be given to the user in any fashion, such as an audio signal, and a prompt response may be provided by activation of a garment appendage. It is understood that the types of functions of electronic devices that are coupled to sensors of one or more appendages of a garment are not limited to those discussed.

Figure 2:
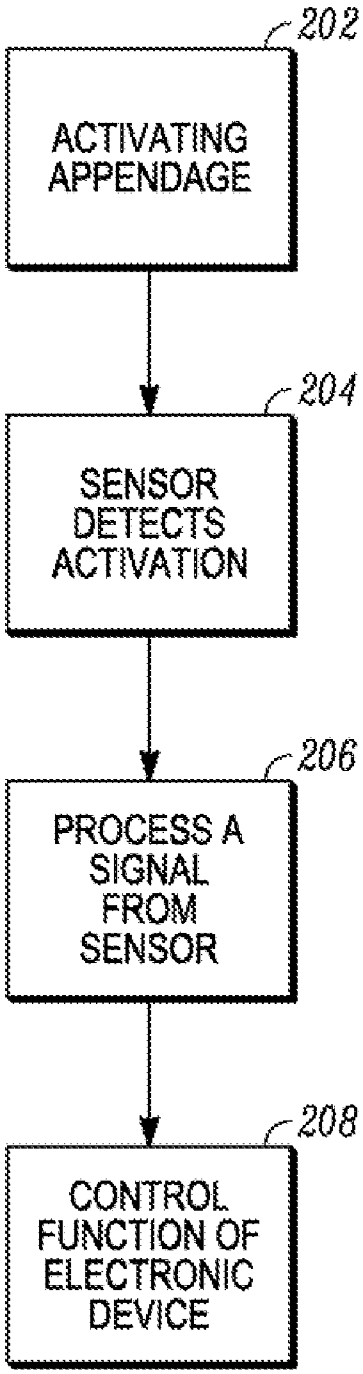
FIG. 2 is a flowchart illustrating a method of a garment.

FIG. 2 is a flowchart illustrating a method of a garment made of a particular type of material as a whole. The garment can have at least one garment appendage comprising substantially the same type of material as the garment as a whole, the garment appendage including a sensor and the garment including a controller coupled to the sensor and an electronic device. By activating the garment appendage 202 so that the sensor detects the activation 204, and by processing a signal from the sensor by the controller 206, the controller can control a function of the electronic device. An electronic device may be a remote to the garment. For example, the controller may communicate via a Bluetooth protocol with a different electronic device. Various functions of electronic devices of a garment will be discussed in more detail below.

Figure 3:
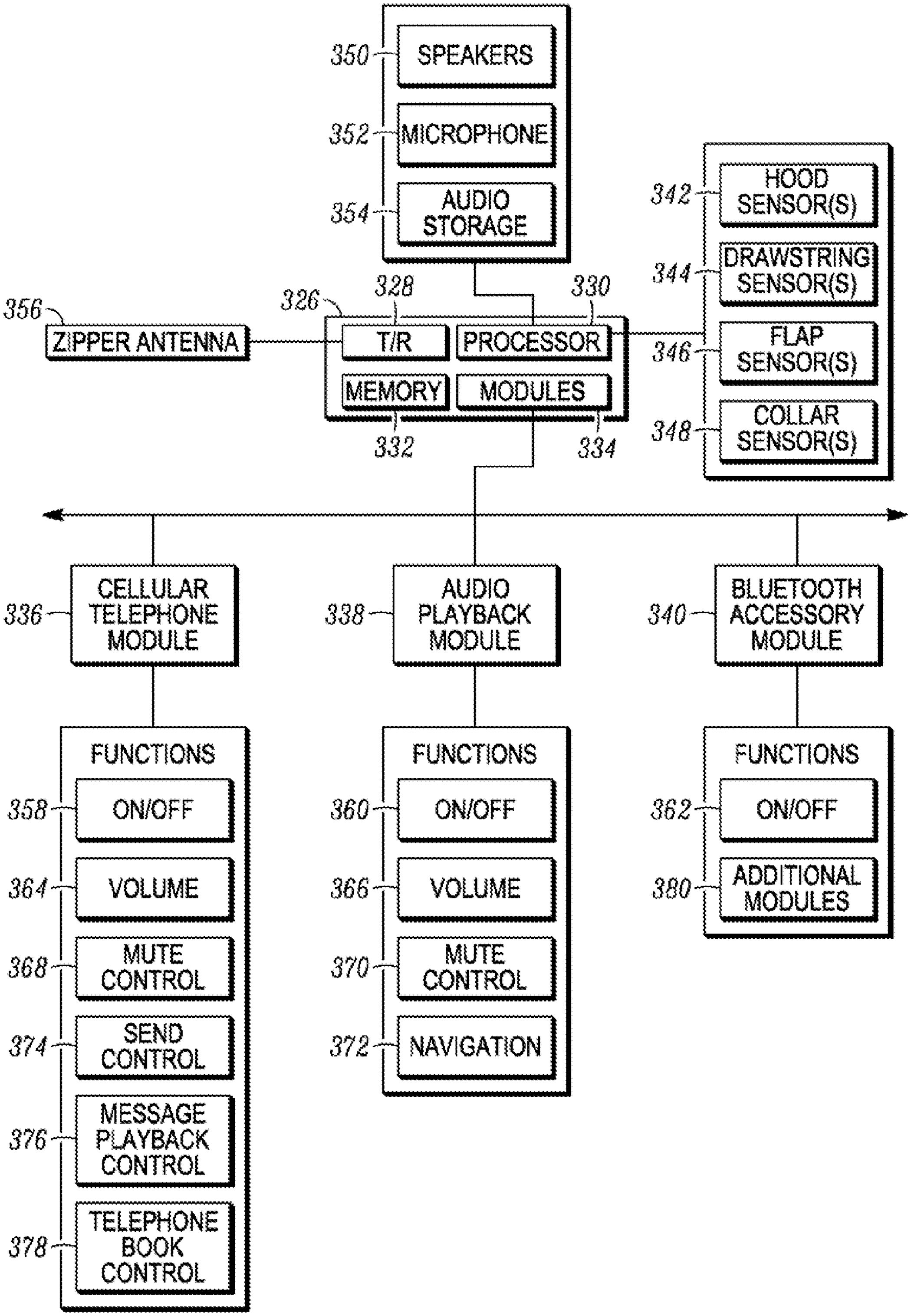
FIG. 3 illustrates certain components of particular electronic devices that may be fixably or removably incorporated into or coupled to the garment of FIG. 1.

FIG. 3 illustrates certain components of particular electronic devices that may be fixably or removably incorporated into or coupled to the garment 102. As mentioned above referring to FIG. 1, a control unit 126 may control functions of electronic device such as cellular telephones and audio playback units. A control unit 126 may be directly coupled to one or more electronic devices and/or may communicate with one or more remote electronic devices as well. In FIG. 3, the control unit 326 is depicted in a block diagram.

The control unit 326 may include electronic components such as a transceiver 328, a processor 330, a memory 332 and modules 334. By way of illustration, modules for a cellular telephone 336, audio playback unit 338 and a Bluetooth accessory device 340 are depicted. The modules can carry out certain processes of the methods as described herein. The modules can be implemented in software, such as in the form of one or more sets of prestored instructions, and/or hardware, which can facilitate the operation of the mobile station or electronic device as discussed below. The modules may be installed at the factory or can be installed after distribution by, for example, a downloading operation. The operations in accordance with the modules will be discussed in more detail below.

A cellular telephone of a cellular telephone module 336 may be implemented as a wireless or mobile communication device (also called a cell phones and a mobile phone). A mobile communication device can be any of a wide variety of devices that have been developed for use within various networks and mobile-to-mobile as well. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

An audio playback unit of the audio playback module 338 may be implemented in any manner. Recently, memory has progressed so that a large number of audio files may be stored in a physically small memory space. Therefore, audio playback units have become smaller in size that those that play CD or cassette tapes It is understood that an audio storage and playback device may be any sort of audio equipment including FM and AM radios as well. Other electronic devices that may be controlled by the control unit 326 can include any type of device including a display screen, a pedometer, a loud speaker, and a light source. It is understood that any type of electronic device may be controlled by control unit 326 based on activation of a garment appendage when sensed by a sensor of an appendage.

As discussed above referring to FIG. 3, the control unit 126 of FIG. 1 may be coupled to sensors which are coupled to the garment appendage. FIG. 3 further shows that the processor 330 of the control unit 326 can be in wired or wireless communication with, for example, one or more hood sensors 342, drawstring sensors 344, flap sensors 346 and collar sensors 348. Similarly, the processor 330 of the control unit 326 can be in wired or wireless communication with hood speakers 350, a microphone 352 and audio storage 354. The transceiver 328 may be in communication with a zipper antenna 356.

The Bluetooth accessory module 340 may provide wireless communication with another wireless device remote to the garment. For example, the Bluetooth accessory module 340 of a Bluetooth device may provide communication with any type of remote device in response to activation of a garment appendage when sensed by a sensor of an appendage. Communication of the control unit 326, for example, may be with a computer or a sensor such as that for security.

The activation of a garment appendage when sensed by a sensor of the appendage may provide controls including an on/off, mute, and volume. For example, raising the hood 104 of the garment of FIG. 1 may activate an on/off control 358, 360 and/or 362. Pulling on the drawstrings may activate volume controls 364 and/or 366. In one embodiment, by pulling or tugging on one of the two drawstrings 118 and 120, the volume may incrementally increase. By pulling or tugging on the other drawstring 118 and 120, the volume may incrementally decrease. A mute control 368 and/or 370 may be activated, for example, by moving an appendage such as flap 108.

The navigation of the audio files 372 in an audio playback device module 338 may be activated in a similar manner to that of the volume control 364 and 366. Furthermore, activating a combination of the appendages may provide additional functionality. For example, raising one flap 108 may put the drawstring 118 and 120 into volume control mode 364 and/or 366. Raising the flap 108 twice may put the drawstrings 118 and 120 into navigation control mode 372. Other combinations of two or more appendage activations may also provide controls to the control unit 326.

The cellular telephone module 336 may provide controls to the control unit 326 for other functions including a send control 374, message playback control 376, telephone book control 378, plus others. It is understood, that a garment may have any number of appendages, and that combinations of activation of appendages can provide input to the controller 326 for control of any type of electronic device function.

The microphone 128 shown in FIG. 1 may receive voice commands that may be input to the control unit 326 and that may be used in combination with activation of a garment appendage when sensed by a sensor of an appendage. Additionally, the garment may include a control panel that provides controls as well. It is understood that any type of other controls to electronic devices used in conjunction with the sensors of the appendages of the garment may be provided as well.

By activating the garment appendage so that the sensor detects the activation and processing a signal from the sensor by the controller, the controller can control a function of the electronic device. Any combination of movement by the appendages and also any combination of other inputs to the control unit 326 are within the scope of this discussion. Accordingly, one or more simple motions of the user may avoid the use of a control panel.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed.

Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the disclosure as determined by the appended claims, as may be amended during the pendency of this application for patent, and all equivalents thereof, when interpreted in accordance with the breadth to which they are fairly, legally and equitably entitled.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

The invention claimed is:

1. A garment made of a particular type of material, the garment comprising:

a garment appendage comprising substantially the same type of material as the garment as a whole, the garment appendage includes at least one drawstring;

a sensor coupled to the garment appendage, the sensor being configured to detect movement of the garment appendage; and a controller coupled to the sensor;

the controller is configured to control a function of an electronic device based on movement of the garment appendage when sensed by the sensor, the electronic device includes volume control and the function includes controlling volume by operation of at least one drawstring.

2. The garment of claim 1 wherein the garment appendage includes a hood and wherein the garment further comprises at least one speaker coupled to the hood.

3. The garment of claim 2 wherein the function comprises suppressing audio output of the at least one speaker.

4. The garment of claim 2 wherein the electronic device includes an audio storage and playback device and the function is further includes initiating audio playback through the speaker.

5. The garment of claim 1 wherein the garment appendage further includes a flap.

6. The garment of claim 1 wherein the electronic device further includes a microphone coupled to the garment appendage and the function further includes activating the microphone.

7. The garment of claim 1 wherein the garment is a sweatshirt.

8. The garment of claim 1 wherein the electronic device is a Bluetooth accessory and the function is communicating with a different electronic device.

9. A sweatshirt comprising:

a sweatshirt body;

a sweatshirt hood coupled to the sweatshirt body;

at least one speaker coupled to the sweatshirt hood;

at least one sensor coupled to the hood, the sensor configured to detect activation of the hood; and a controller coupled to the sensor, the controller configured to control an audio function based on the activation of the hood.

10. The sweatshirt according to claim 9, wherein:

the sensor is further configured to detect activation of the hood by detecting an up position and a down position of the hood, and the controller controls an audio function based on the position of the hood.

11. The sweatshirt according to claim 10, wherein the audio function comprises at least one of a mute function and a cellular communication send function.

12. The sweatshirt according to claim 9, wherein the at least one sensor comprises two sensors, wherein the two sensors detect an activation of the hood based on a detected distance between the sensors.

13. The sweatshirt according to claim 9, wherein the hood includes drawstrings coupled to the hood, and wherein the sensor detects activation of the hood by detecting operation of the drawstrings.

14. The sweatshirt according to claim 13, wherein the audio function comprises a volume control.

15. The sweatshirt according to claim 9, wherein the controller includes a Bluetooth module configured to send and receive short range wireless communication signals.

16. The sweatshirt according to claim 9, further comprises a microphone coupled to the controller.

17. A method of a garment made of a particular type of material, the garment having at least one garment appendage comprising substantially the same type of material as the garment as a whole, the garment appendage comprising a sensor, the garment comprising a controller coupled to the sensor and an electronic device, the method comprising:

activating the garment appendage including at least one drawstring, so that the sensor detects the activation; and processing a signal from the sensor by the controller so that the controller controls a function of the electronic device, wherein the electronic device includes volume control and the function includes controlling volume by operation of at least one drawstring.

18. A method of claim 17 wherein the function of the electronic device comprises:

communicating via a Bluetooth protocol with a different electronic device.

* * * * *